United States Patent
Constantin et al.

(10) Patent No.: US 7,236,653 B2
(45) Date of Patent: Jun. 26, 2007

(54) SYSTEM AND METHOD FOR LOCATING DOCUMENT AREAS USING MARKUP SYMBOLS

(75) Inventors: Michael Constantin, Irvine, CA (US); David Lovat, Huntington Beach, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 845 days.

(21) Appl. No.: 10/400,280

(22) Filed: Mar. 27, 2003

(65) Prior Publication Data
US 2004/0190772 A1    Sep. 30, 2004

(51) Int. Cl.
G06K 9/60 (2006.01)
G06K 9/03 (2006.01)
(52) U.S. Cl. .................................................... 382/306
(58) Field of Classification Search ................ 382/113, 382/181, 198, 305, 306, 311, 321; 358/505, 358/523; 345/619, 650; 707/512; 715/866
See application file for complete search history.

(56) References Cited

U.S. PATENT DOCUMENTS

| | | | |
|---|---|---|---|
| 5,579,419 A | 11/1996 | Yaguchi et al. | 382/305 |
| 5,761,328 A * | 6/1998 | Solberg et al. | 382/113 |
| 5,848,202 A | 12/1998 | D'Eri et al. | 383/306 |
| 6,279,014 B1 | 8/2001 | Schilt et al. | 707/512 |
| 6,351,574 B1 * | 2/2002 | Yair et al. | 382/321 |
| 7,039,256 B2 * | 5/2006 | Zlotnick et al. | 382/311 |
| 7,111,255 B2 * | 9/2006 | Zlotnick | 715/866 |

* cited by examiner

*Primary Examiner*—Amir Alavi
(74) *Attorney, Agent, or Firm*—Law Office of Gerald Maliszewski; Gerald Maliszewski

(57) ABSTRACT

A system and method are provided for processing a document. The method comprises: marking an area of a document, using at least one predetermined markup symbol; identifying a markup symbol; using the identified markup symbol to locate the document area; determining characters in the document area; and, processing the determined characters. Fields that can be processed include title, keywords, author, signature, document name, category, subject, or document status, to name but a few examples. In some aspects, marking an area of a document, using at least one predetermined markup symbol includes: electronically marking using a medium such as a touchscreen, pressure pad, or a mouse. Alternately, the paper document can be physically marked (with a pen or pencil) before scanning. Typically, marking an area of a document includes forming a markup character proximate to an enclosing figure. A wide range of markup characters can be defined cross-referenced to document processes.

23 Claims, 3 Drawing Sheets

Fig. 1
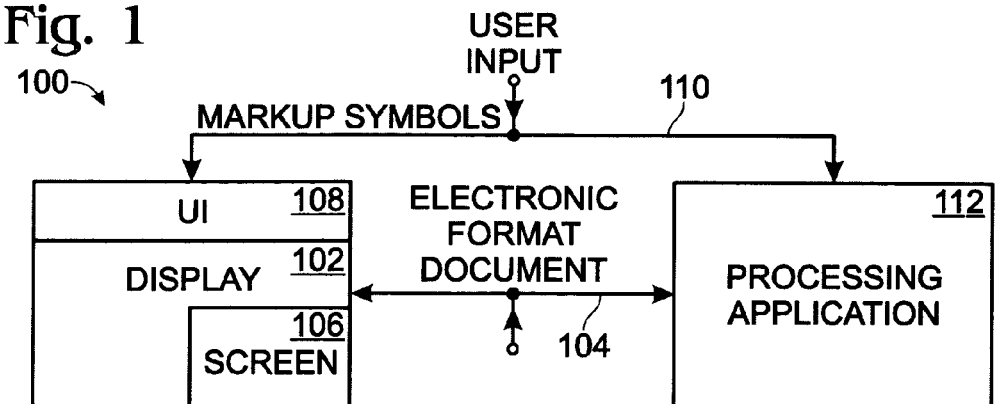
Fig. 2
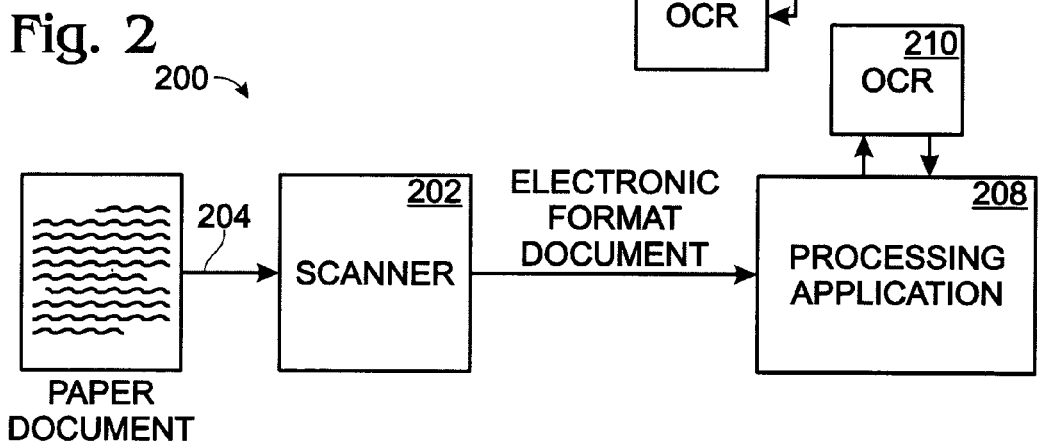
Fig. 3

SYSTEM AND METHOD FOR LOCATING DOCUMENT AREAS USING MARKUP SYMBOLS

BACKGROUND OF THE INVENTION

1. Field of the Invention

This invention generally relates to document processing and, more particularly, to a system and method of using markup symbols to automatically identify and process selected areas of a document.

2. Description of the Related Art

There are many conventional means of identifying specialized text zones that involve the use of form recognition software. These means rely on pre-defined forms. This technique requires the user to select, and/or to create a form prior to running the application. Obviously, this form recognition process is limited to the number of pre-defined forms. Further, the data must be submitted on one of the pre-defined forms. Other applications require the user to view the scanned image on a PC and perform some kind of drawing operation to identify document zones. This two-step process can be cumbersome.

Other convention solutions involve the application of bar-code labels, and/or the use separator sheets with meta-data.

It would be advantageous if areas of a form could directly be identified without an intervening user-driven action.

It would be advantageous if the identified document areas could be processed with an intervening step to correlate processes to identified areas.

SUMMARY OF THE INVENTION

The present invention permits a user to manually annotate a document prior to scanning, for the purpose of identifying text zones that contain special types of content, such as words or phrases. Using a pre-defined symbol language, the user marks up the document to identify items such as the document title, keywords, author's name, signature, document number, status, etc. The scanned image file is then processed by an application that performs Optical Character Recognition (OCR) on the marked areas, processing the textual content based on the type of data as determined by the meaning of the mark-up symbol.

This solution eliminates both the form creation step, and the PC drawing operation. Instead, at the time of scanning, the user can mark up the document for ad-hoc zone recognition. This allows the user to give meaning to any document that they are scanning, rather than just those that have been pre-defined by their position on the form. An alternate process permits the user to electronically markup an electronically formatted version of the document.

Accordingly, a method is provided for processing a document. The method comprises: marking an area of a document, using at least one predetermined markup symbol; identifying a markup symbol; using the identified markup symbol to locate the document area; determining characters in the document area; and, processing the determined characters. Fields that can be processed include title, keywords, author, signature, document name, category, subject, or document status, to name but a few examples.

In some aspects, marking an area of a document, using at least one predetermined markup symbol includes: electronically marking using a medium such as a touchscreen, pressure pad, or a mouse. Alternately, the paper document can be physically marked (with a pen or pencil) before scanning.

Typically, marking an area of a document, using at least one predetermined markup symbol, includes forming a figure to substantially enclose the document area. However, the figure shape and definition need not be exactly perfect. In one aspect, the document area is defined by a figure that encloses greater than 80% of the document area. The figure shape can be circle, rectangle, oval, or a polygon, for example.

Typically, marking an area of a document, using at least one predetermined markup symbol, includes forming a markup character proximate to the enclosing figure. A wide range of markup characters can be defined, cross-referenced to fields.

Additional details of the above-described method and an associated electronic document processing system are described below.

BRIEF DESCRIPTION OF THE DRAWINGS

FIG. 1 is a schematic block diagram of the present invention electronic document processing system.

FIG. 2 is a schematic block diagram illustrating the present invention scanned document processing system.

FIG. 3 is a diagram illustrating an exemplary markup language key.

DETAILED DESCRIPTION OF THE PREFERRED EMBODIMENTS

Figure 4:
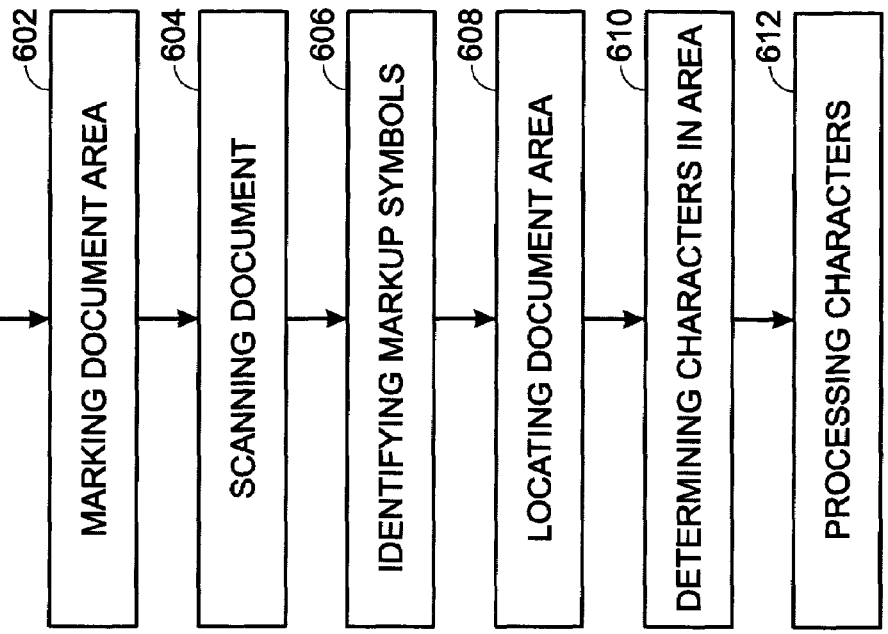
FIG. 4 is an exemplary document with markups.

FIG. 1 is a schematic block diagram of the present invention electronic document processing system. The system 100 comprises an electronic display 102 having an interface on line 104 to accept an electronically formatted document and a screen 106 to depict the document. A user interface (UI) 108 associated with the display has a port on line 110 to accept markup symbols marking areas of the document. Some examples of a user interface include a touch screen overlying the display, a pressure pad underlying the display, or a mouse. Other user interfaces are also applicable.

A processing application 112 has a port connected to the user interface port on line 110 and a port on line 104 for receiving the electronically formatted document. The document may be supplied by a scanner or from a memory (not shown). For example, the document may be a Word file stored on a personal computer (not shown). The processing application 112 identifies the markup symbol, uses the identified markup symbol to locate document areas, determines characters in the document areas, and processes the determined characters. The processing application 112 processes the determined characters as a field. Some examples of a field include title, keywords, author, signature, document name, category, subject, and/or document status. Document status includes such things as whether the document is open, closed, pending approval, write protected, to name but a few. Other, unnamed types of fields could also be processed.

Typically, the processing application 112 includes, or is associated with, an optical character resolution (OCR) application 116 that reads the characters in the located document areas. Alternately, masks could be generated to filter the characters from the located document areas.

The processing application 112 identifies a markup symbol, selected from a plurality of markup symbols, and processes the determined characters as one of a plurality of fields, in response to the identified markup symbol. For example, the letter "T" could be used as a markup symbol, to identify a title field. Otherwise, non-alpha-numeric symbols can be generated to distinguish the markup symbols from characters in the document text.

In some aspects, the user interface 108 accepts a substantially enclosing figure command, and the processing application 112 identifies the enclosing figure to locate an area of a document. Obviously, the definition of substantially closed can vary. In one aspect, the processing application identifies a substantially enclosing figure as one that encloses greater than 80% of the document area. However, the invention is not limited to any particular degree of closure. The enclosing figure can be a circle, rectangle, oval, or polygon. However, the system is not limited to any particular shape.

In one aspect, the user interface 108 accepts a markup character command proximate to the enclosing figure command. For example, a "T" markup character may be placed immediately next to a circle enclosing a document title. The processing application 112 identifies the markup symbol, from among a plurality of markup symbols, in response to recognizing the markup character. The processing application 112 may use the OCR application 116 to identify the enclosing figures and to read the markup characters proximate to the enclosing figures.

Since the present invention symbol is able to process different types of fields in the same document, in some aspects the processing application 112 identifies a markup symbol, selected from a plurality of markup symbols, for each corresponding document field.

Although the above-mentioned system has been described in schematic fashion, it should be understood that many of the elements may be embodied as software or firmware elements including a memory for storing software instructions and processor to enact the instructions.

FIG. 2 is a schematic block diagram illustrating the present invention scanned document processing system. The system 200 comprises a scanner 202 having an input on line 204 to accept a paper format document and an output on line 206 to supply an electronic format document. A processing application 208 has an interface connected to the scanner output on line 206 to accept the electronically formatted document. The processing application 208 identifies scanned markup symbols, locates areas of the document using the markup symbols, determines characters in the document areas, and processes the determined characters.

The processing application 208 processes the determined characters as a field such as title, keywords, author, signature, document name, category, subject, and/or document status. In some aspects, the processing application 208 further includes, or is associated with an optical character resolution (OCR) application 210 that reads the determined characters in the located document areas.

In some aspects, the processing application 208 identifies a markup symbol, selected from a plurality of markup symbols. Then, the processing application processes the determined characters as one of a plurality of fields, in response to the identified markup symbol.

In other aspects, the scanner 202 scans a substantially enclosing figure and the processing application 208 uses the enclosing figure to locate an area of a document. The processing application 208 may identify a substantially enclosing figure that encloses greater than 80% of the document area, for example. As mentioned above, the enclosing figure may be a circle, rectangle, oval, or polygon.

In some aspects, the scanner 202 scans a markup character proximate to an enclosing figure and the processing application 208 identifies the markup symbol in response to recognizing the markup character. The processing application 208 may use the associated OCR application 210 to identify the enclosing figures and to read the markup characters proximate to the enclosing figures. In other aspects, the processing application 208 identifies a markup symbol, selected from a plurality of markup symbols, for each corresponding document field.

In some aspects, the scanner 202 scans a transparency marked with markup symbols. Note, the transparency need not be overlying the document at the time of scanning. The processing application 208 associates the scanned transparency with the electronically formatted document, identifies enclosing figures on the transparency, and calculates the superimposed position of the enclosed figures on the associated scanned document.

In other aspects, the scanner 202 scans a document marked with at least one predetermined markup color. Then, the processing application 208 identifies the markup color and locates document areas by identifying the document areas enclosed by the markup color. For example, the processing application 208 may identify a markup color, selected from a plurality of markup colors, for each corresponding document field.

Although the above-mentioned system has been described in schematic fashion, it should be understood that many of the elements may be embodied as software or firmware elements including a memory for storing software instructions and processor to enact the instructions.

FUNCTIONAL DESCRIPTION

The present invention is based upon the establishment of a simple mark-up language. Each symbol identifies a unique class of textual data. The symbols can be ones that are easily drawn, and are designed to encircle an area on the document.

FIG. 3 is a diagram illustrating an exemplary markup language key. As shown, each symbol is a symmetrical, closed shape, e.g. an oval, a rectangle, etc. and one uppercase letter markup character, e.g. "T", "K", "X", etc. drawn in the vicinity of the shape, in its upper-right corner. The mapping of this character to a specific metadata can be defined by the user. Note, this is just one example of a class of markup symbols.

Prior to scanning, the user reads the hard-copy document, and uses the markup language to apply meaning to specific areas of the document. Refer to FIG. 4, for an example. The procedure is slightly different using a black-and-white, as opposed to a color scanner. For black-and-white scanners or multi-functional printers (MFPs), the user places a special transparency sheet over each document page that requires the markup, proceeds with the markup, and then scans the transparency followed by the document page. A document feeder can be used, or two or more consecutive scans can be performed. The software system that processes the scanned image document identifies the special transparency sheet and associates it with the scanned document page. This procedure ensures that the markup does not degrade the accuracy of possible subsequent OCR processes or the entire document (page).

FIG. 4 is an exemplary document with markups. For a color scanner or MFP, the document page can be marked up in place (i.e. without the need for a special transparency sheet), using a special color marker. The software system that processes the scanned image document can be calibrated with the color marker, and the color is defined as the mark-up color. In this manner, the mark-up color does not affect the potential OCR of the entire document (page).

The image file resulting from the scan operation is processed by a software system running on a computer system that can interpret the mark-up symbols. The closed shape of the mark-ups are recognized either on the transparency sheet, or on the document page directly, based on the mark-up color. Each shape is normalized to a smallest rectangular area that encompasses it. The associated symbol is identified by its position and proximity to the resultant rectangular area, and is converted by a simple handwriting recognition module to a single character. The list of all mark-ups on the page as rectangle coordinates and type is then passed to the next OCR module.

The OCR module performs OCR of the document page, only in the mark-up zones. The textual content and its associated type are then written to meta-data storage. In other words, the text resulting from the OCR of those areas marked by the keyword symbol, are stored as keywords in the meta-data storage, and the area marked by the subject symbol is stored as the subject in the meta-data storage.

Subsequent programs can be written that read the meta-data storage and perform database entries, or entries in a document management system to file the document so that it can be retrieved by subject, keyword, or other properties.

Figure 5:
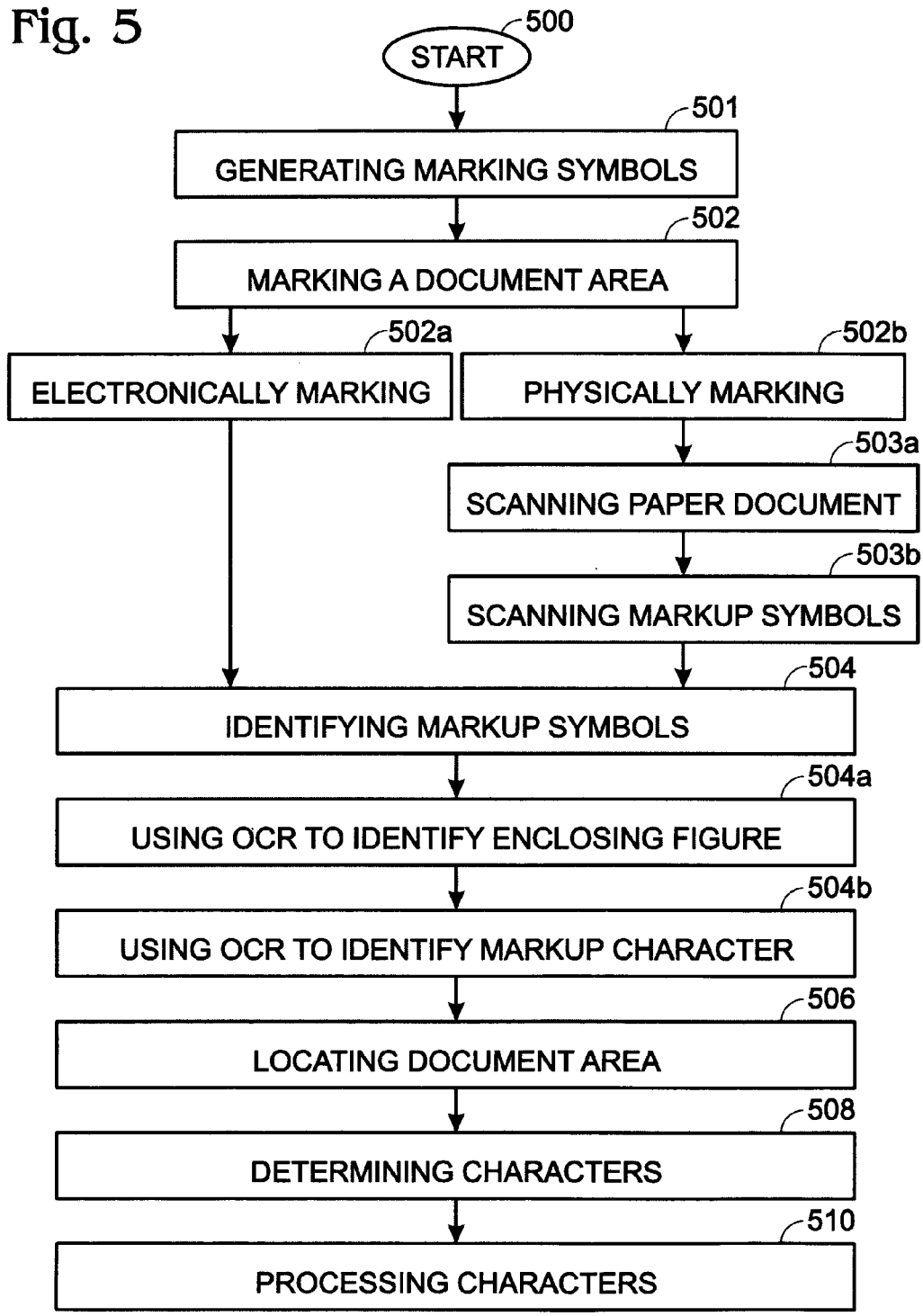
FIG. 5 is a flowchart illustrating the present invention method for processing a document.

FIG. 5 is a flowchart illustrating the present invention method for processing a document. Although the method (and the method associated with FIG. 6) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 marks an area of a document, using at least one predetermined markup symbol. Step 504 identifies a markup symbol. Step 506 uses the identified markup symbol to locate the document area. Step 508 determines characters in the document area. Step 510 processes the determined characters.

Marking an area of a document, using at least one predetermined markup symbol in Step 502 includes alternate substeps. Step 502a electronically marks using a medium such as a touchscreen or a pressure pad. Alternately, Step 502b physically marks (a paper document or transparency overlying the paper document).

In some aspects of the method, processing the determined characters in Step 510 includes processing the characters as a field such as title, keywords, author, signature, document name, category, subject, and/or document status. However, other types of fields are also possible.

In other aspects, determining characters in the document area in Step 508 includes using an optical character resolution (OCR) application to read the characters.

In some aspects a further step, Step 501 generates a plurality of markup symbols, each markup symbol corresponding to a document field. Then, identifying a markup symbol in Step 504 includes identifying a markup symbol from the plurality of markup symbols. Likewise, processing the determined characters in Step 510 includes processing the characters as one of the plurality of fields, in response to the identified markup symbol. For example, generating a plurality of markup symbols in Step 501 may include generating a markup character for each corresponding document field.

In some aspects, marking an area of a document, using at least one predetermined markup symbol, (Step 502) includes forming a figure to substantially enclose the document area. For example, a figure may enclose greater than 80% of the document area. Other definitions of "enclosed" are possible. The figure may be a circle, a rectangle, an oval, or polygon.

In some aspects, marking an area of a document, using at least one predetermined markup symbol, (Step 502) includes forming a markup character proximate to the enclosing figure.

In other aspects, identifying a markup symbol in Step 504 includes substeps. Step 504a uses an OCR application to identify the enclosing figure. Step 504b uses an OCR application to read the markup characters proximate to the enclosing figure.

In some aspects, marking an area of a document through physically marking (Step 502b) may result in additional steps. Step 503a electronically scans a paper format document. Step 503b scans the markup symbols.

Physically marking in Step 502b may include additional substeps (not shown). Step 502b1 superimposes a transparency overlying the document. Step 502b2 marks the transparency. Then, scanning the markup symbols in Step 503b includes substeps (not shown). Step 503b1 scans the transparency. Step 503b2 associates the scanned transparency with scanned document.

Further, identifying a markup symbol in Step 504 may include identifying the markup symbols on the transparency. Then, using the identified markup symbol to locate the document area in Step 506 includes substeps (not shown). Step 506a identifies enclosing figures on the transparency. Step 506b calculates the superimposed position of the enclosed figures on the associated scanned document.

In other aspects, physically marking in Step 502b includes marking the paper format document with a predetermined markup color. Then, identifying a markup symbol in Step 504 includes identifying the markup color, and using the identified markup symbol to locate the document area in Step 506 includes identifying the document area enclosed by the markup color. Further, generating a plurality of markup characters corresponding to the plurality of document fields in Step 501 may include generating a plurality of markup colors, one color for each corresponding document field.

Figure 6:
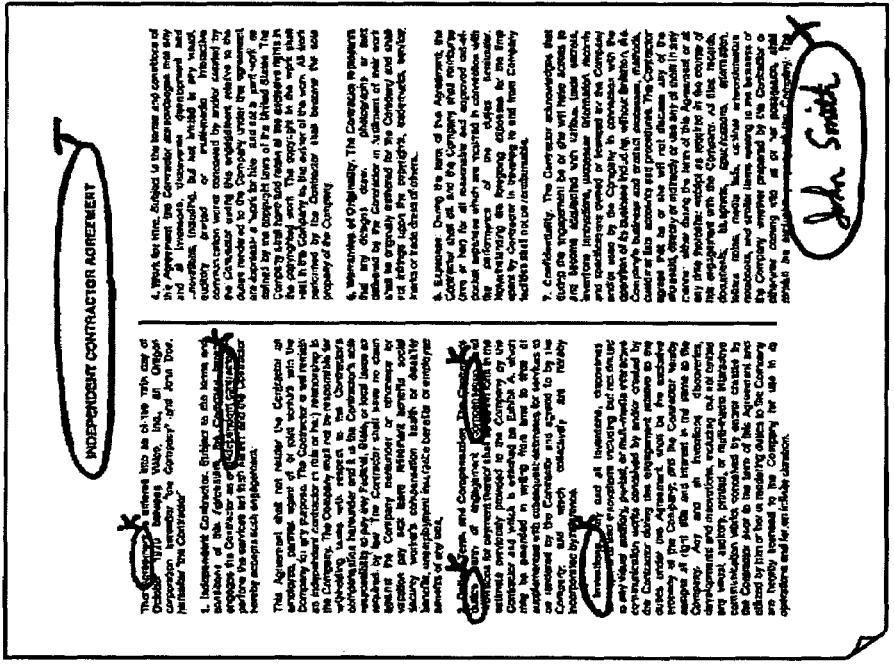
FIG. 6 is a flowchart illustrating the present invention method for processing a scanned document.

FIG. 6 is a flowchart illustrating the present invention method for processing a scanned document. The method starts at Step 600. Step 602 marks an area of a document, using at least one predetermined markup symbol. Step 604 electronically scans the document. Step 606 identifies a scanned markup symbol. Step 608 uses the identified markup symbol to locate the document area. Step 610 determines characters in the document area. Step 612 processes the determined characters.

A system and method have been provided for automatically processing documents fields identified with markup symbols. Examples have been used to illustrate and clarify the invention. However, the invention is not limited to merely these examples. Other variations and embodiments of the invention will occur to those skilled in the art.

We claim:

1. A method for processing a document, the method comprising:

generating a plurality of markup symbols, each markup symbol corresponding to a document field;

marking an area of a document, using at least one predetermined markup symbol selected from a group of processes consisting of:

electronically marking using a medium selected from the group including a touchscreen and a pressure pad; and, physically marking:

identifying the markup symbol;

using the identified markup symbol to locate the document area;

determining characters in the document area using an optical character resolution (OCR) application to read the characters; and, processing the determined characters as one of the plurality of fields in response to the identified markup symbol, where a field is selected from the group including title, keywords, author, signature, document name, category, subject, and document status.

2. The method of claim 1 wherein marking an area of a document, using at least one predetermined markup symbol, includes forming a figure to substantially enclose the document area.

3. The method of claim 2 wherein forming a figure to substantially enclose the document area includes forming a figure that encloses greater than 80% of the document area.

4. The method of claim 2 wherein forming a figure to substantially enclose the document area includes forming a figure selected from the group including a circle, a rectangle, an oval, and a polygon.

5. The method of claim 1 wherein marking an area of a document, using at least one predetermined markup symbol, includes forming a markup character proximate to the enclosing figure.

6. The method of claim 5 wherein identifying a markup symbol includes:

using an OCR application to identify the enclosing figure; and, using an OCR application to read the markup characters proximate to the enclosing figure.

7. The method of claim 6 wherein generating a plurality of markup symbols, each markup symbol corresponding to a document field, includes generating a markup character for each corresponding document field.

8. The method of claim 7 wherein marking an area of a document, using at least one predetermined markup symbol includes physically marking;

the method further comprising:

electronically scanning a paper format document; and, scanning the markup symbols.

9. The method of claim 8 wherein physically marking includes:

superimposing a transparency overlying the document; and, marking the transparency; and, wherein scanning the markup symbols includes:

scanning the transparency; and, associating the scanned transparency with scanned document.

10. The method of claim 9 wherein identifying a markup symbol includes identifying the markup symbols on the transparency; and, wherein using the identified markup symbol to locate the document area includes:

identifying enclosing figures on the transparency; and, calculating the superimposed position of the enclosed figures on the associated scanned document.

11. The method of claim 8 wherein physically marking includes marking the paper format document with a predetermined markup color.

12. The method of claim 11 wherein identifying a markup symbol includes identifying the markup color; and, wherein using the identified markup symbol to locate the document area includes identifying the document area enclosed by the markup color.

13. The method of claim 12 wherein generating a plurality of markup characters corresponding to the plurality of document fields includes generating a plurality of markup colors, one color for each corresponding document field.

14. A scanned document processing system, the system comprising:

a scanner having an input to accept a paper format document and an output to supply an electronic format document;

a processing application having an interface connected to the scanner output to accept the electronically formatted document, identify scanned markup symbols selected from a plurality of markup symbols, locate areas of the document using the markup symbols to determine characters in the document areas, read the determined characters in the located document areas using an optical character resolution (OCR) application, and process the determined characters as one of a plurality of fields in response to the identified markup symbol, where a field is selected from the group including title, keywords, author, signature, document name, category, subject, and document status.

15. The system of claim 14 wherein the scanner scans a substantially enclosing figure; and, wherein the processing application uses the enclosing figure to locate an area of a document.

16. The system of claim 15 wherein the processing application identifies a substantially enclosing figure that encloses greater than 80% of the document area.

17. The system of claim 15 wherein the processing application identifies an enclosing figure selected from the group including a circle, a rectangle, an oval, and a polygon.

18. The system of claim 15 wherein the scanner scans a markup character proximate to an enclosing figure; and, wherein the processing application identifies the markup symbol in response to recognizing the markup character.

19. The system of claim 18 wherein the processing application uses an OCR application to identify the enclosing figures and to read the markup characters proximate to the enclosing figures.

20. The system of claim 19 wherein the processing application identifies a markup symbol, selected from a plurality of markup symbols, for each corresponding document field.

21. The system of claim 20 wherein the scanner scans a transparency marked with markup symbols; and, wherein the processing application associates the scanned transparency with the electronically formatted document, identifies enclosing figures on the transparency, and calculates the superimposed position of the enclosed figures on the associated scanned document.

22. The system of claim 20 wherein the scanner scans a document marked with at least one predetermined markup color; and, wherein the processing application identifies the markup color and locates document areas by identifying the document areas enclosed by the markup color.

23. The system of claim 22 wherein the processing application identifies a markup color, selected from a plurality of markup colors, for each corresponding document field.

* * * * *